United States Patent
Shvydun et al.

(10) Patent No.: US 8,837,570 B2
(45) Date of Patent: Sep. 16, 2014

(54) RECEIVER WITH PARALLEL DECISION FEEDBACK EQUALIZERS

(71) Applicant: LSI Corporation, Milpitas, CA (US)

(72) Inventors: Volodymyr Shvydun, Los Altos, CA (US); Tomasz Prokop, Pleasanton, CA (US)

(73) Assignee: LSI Corporation, Milpitas, CA (US)

( * ) Notice: Subject to any disclaimer, the term of this patent is extended or adjusted under 35 U.S.C. 154(b) by 122 days.

(21) Appl. No.: 13/685,993

(22) Filed: Nov. 27, 2012

(65) Prior Publication Data

US 2014/0146867 A1    May 29, 2014

(51) Int. Cl.
*H03H 7/30*        (2006.01)
*H04L 25/03*       (2006.01)

(52) U.S. Cl.
CPC ................................. *H04L 25/03885* (2013.01)
USPC ........................................................ 375/233

(58) Field of Classification Search
CPC ................. H04L 25/03006; H04L 2025/0349; H04L 25/03057; H04L 25/063; H04L 25/03318; H04L 27/01
USPC ................... 375/229, 232, 233; 708/300, 323; 333/18, 28 R; 360/65
See application file for complete search history.

(56) References Cited

U.S. PATENT DOCUMENTS

| | | | |
|---|---|---|---|
| 2002/0122503 A1* | 9/2002 | Agazzi ........................ | 375/316 |
| 2008/0069199 A1* | 3/2008 | Chen et al. ................... | 375/233 |
| 2009/0016422 A1* | 1/2009 | Zhong et al. ................. | 375/233 |
| 2009/0310665 A1* | 12/2009 | Agazzi et al. ................ | 375/229 |
| 2011/0142120 A1* | 6/2011 | Liu et al. ...................... | 375/233 |
| 2013/0230092 A1* | 9/2013 | Prokop et al. ................ | 375/233 |

OTHER PUBLICATIONS

Parhi, Keshab K., et al.; Parallel Implementation of the DSP Functions of the PAM-5 10Gb/s Transceiver; IEEE 802.3ae Task Force, Mar. 2000; Broadcom Corporation, Irvine, CA.

* cited by examiner

*Primary Examiner* — Aristocratis Fotakis

(57) ABSTRACT

Described embodiments apply equalization to an input signal to a receiver such as a serial-deserializer. The receiver has an analog-to-digital converter (ADC), an M-way parallelizer, N serial buffers, N prefix buffers, and N decision feedback equalizers (DFEs), where M and N are greater than one. The ADC digitizes the input signal to form digitized symbols. The parallelizer assembles the digitized symbols into parallel sets of M digitized symbols. Each serial buffer has slots of M locations per slot and stores one set of M digitized symbols in one of the slots. The DFEs are responsive to common tap weight coefficients and produce parallel sets of M recovered data bits. Each DFE is first trained using sets of past digitized symbols loaded into a corresponding one of the prefix buffers and then processes digitized symbols stored in a corresponding one of the serial buffers.

34 Claims, 6 Drawing Sheets

300

430

RECEIVER WITH PARALLEL DECISION FEEDBACK EQUALIZERS

CROSS-REFERENCE TO RELATED APPLICATIONS

The subject matter of this application is related to U.S. patent application Ser. Nos. 13/368,314 and 13/368,315 both filed on 7 Feb. 2012, Ser. No. 13/410,473 filed on 2 Mar. 2012, and Ser. No. 13/419,009 filed 13 Mar. 2012, the teachings of all of which are incorporated herein in their entireties by reference.

BACKGROUND

In many data communication applications, serializer and de-serializer (SERDES) devices facilitate the transmission of parallel data between two points across a serial link. Data at one point is converted from parallel data to serial data and transmitted through a communications channel to the second point where it received and converted from serial data to parallel data.

At high data rates, frequency-dependent signal loss occurring from the communications channel (the signal path between the two end points of a serial link), as well as signal dispersion and distortion, can occur. Ideally, without noise, jitter, and other loss and dispersion effects, a data eye at the receiver will exhibit a relatively ideal shape. In practice, the shape of the data eye changes with noise, jitter, other loss and dispersion effects, and with temperature and voltage variations. As such, the communications channel, whether wired, optical, or wireless, acts as a filter and might be modeled in the frequency domain with a transfer function. Correction for frequency dependent losses of the communications channel, and other forms of signal degradation, often requires signal equalization of the signal at a receiver.

Equalization through use of one or more equalizers compensates for the signal degradation to improve communication quality. Equalization may also be employed at the transmit side to pre-condition the signal. Equalization, a form of filtering, generally requires some estimate of the transfer function of the channel to set its filter parameters. However, in many cases, the specific frequency-dependent signal degradation characteristics of a communications channel are unknown, and often vary with time. In such cases, an equalizer with adaptive setting of parameters providing sufficient adjustable range might be employed to mitigate the signal degradation of the signal transmitted through the communications channel. Equalization might be through a front-end equalizer, a feedback equalizer, or some combination of both. The shape of the data eye also changes due to equalization applied to input signal of the receiver. In some systems, equalization applied by a transmitter's equalizer further alters the shape of the eye from the ideal.

If an analog equalizer is employed in the analog front-end (AFE), the data eye-operating margin improves. However, better performance might be achieved through use of a Decision Feedback Equalizer (DFE) in combination with an equalizer in the AFE. Classical DFE equalization cancels a significant amount of intersymbol interference (ISI) and opens up the vertical and horizontal data eye opening. In SERDES communication channels, DFE filtering is employed to cancel post-cursor ISI in the equalized channel's pulse response by subtracting the output of the DFE from an input signal. DFE filters include a number of taps, the number of which determines how well the post-cursor ISI might be cancelled by subtracting the output of the DFE from the input signal. The longer the filter length (i.e., the more filter taps), the more ISI terms might be cancelled, but at the expense of increasing DFE filter complexity and power consumption. Typically, the DFE coefficients are automatically adjusted with adaptive algorithms such as least mean square (LMS). In high speed applications the data path equalization components are most often implemented as analog, transistor level circuits and the adaptation is implemented as digital blocks.

An alternative approach implements only an analog to digital converter (ADC) in the AFE, and all other processing of the received signal is implemented fully in the digital domain. Such a Digital Signal Processing (DSP) data path offers better reliability, testability and flexibility, but presents implementation challenges due to lower clock speeds available in digital designs, leading to a need for greater parallelization of the DSP processing. One of the main equalization components, the DFE, is particularly difficult to parallelize due to its inherent feedback structure. One parallelization approach is to implement a fully "unrolled" DFE (the DFE is implemented without feedback paths), but this yields prohibitively large designs for practical applications, scaling exponentially with the number of tap coefficients or inversely with channel quality metrics.

In a fully digital SERDES receiver the equalization data path is fully implemented as digital blocks and typically follows a variable gain amplifier (VGA) and an ADC at the input. A typical digital data path comprises a feed forward equalizer (FFE), a DFE, and adaptation and calibration circuits. For a digital signal processor (DSP) implementation, the clock frequencies available in the digital data path are typically an order of magnitude, for example eight to sixteen times, slower than in case of the analog datapath equalization. To maintain the data rate through the receiver, the receiver data path is parallelized by the same factor (eight to sixteen times). DFE implementations do not parallelize efficiently due to the need of an immediate feedback from the previous bit to the next bit of processed data. To address this architectural feature in parallel implementations of the DFE, an unrolling technique may be used, but this yields prohibitively large designs for practical applications, scaling exponentially with the number of tap coefficients. For the typically needed six to ten tap DFE, the size/power cost is prohibitive.

In order to avoid the huge size/power penalty of a large parallelized DFE, a feed-forward equalizer (FFE) might be used in place of a traditional DSP-implemented DFE, or in combination with DFE with fewer taps, making the data path easier to parallelize and implement for very fast data rates. In order to cover all the significant ISI contributing positions in a given channel the delay line of the FFE might typically span several tens of signal symbol time intervals (samples) e.g., 40-50 samples. A parallel FFE of this order of implementation having several taps on such a long delay line is relatively complex, and has high power consumption.

In addition, an FFE for ISI cancellation is not as efficient as a DFE alone as an FFE might increases noise content in the signal and might introduce additional ISI, while reducing the ISI in the input signal. Thus, for ISI cancellation it is generally desirable to employ a form of DFE in the receiver.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide an apparatus for equalizing an input signal to a receiver. The receiver has an analog to digital converter, a parallelizer, N serial buffers, and N decision feedback equalizers. The analog-to-digital converter digitizes the input signal to form digitized symbols. The parallelizer assembles the digitized symbols from the analog-to-digital converter into parallel sets of M digitized symbols. Each serial buffer of the N serial buffers has C slots of M locations per slot, where M and N are integers greater than one and C is an integer greater than zero, and stores one of the sets of M digitized symbols from the parallelizer in one of the slots. The N decision feedback equalizers are responsive to common tap weight coefficients and produce parallel sets of M recovered data bits. Each equalizer of the N decision feedback equalizers is coupled to a corresponding one of the N serial buffers to process digitized symbols stored in the corresponding one of the N serial buffers.

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

DETAILED DESCRIPTION

Figure 1:
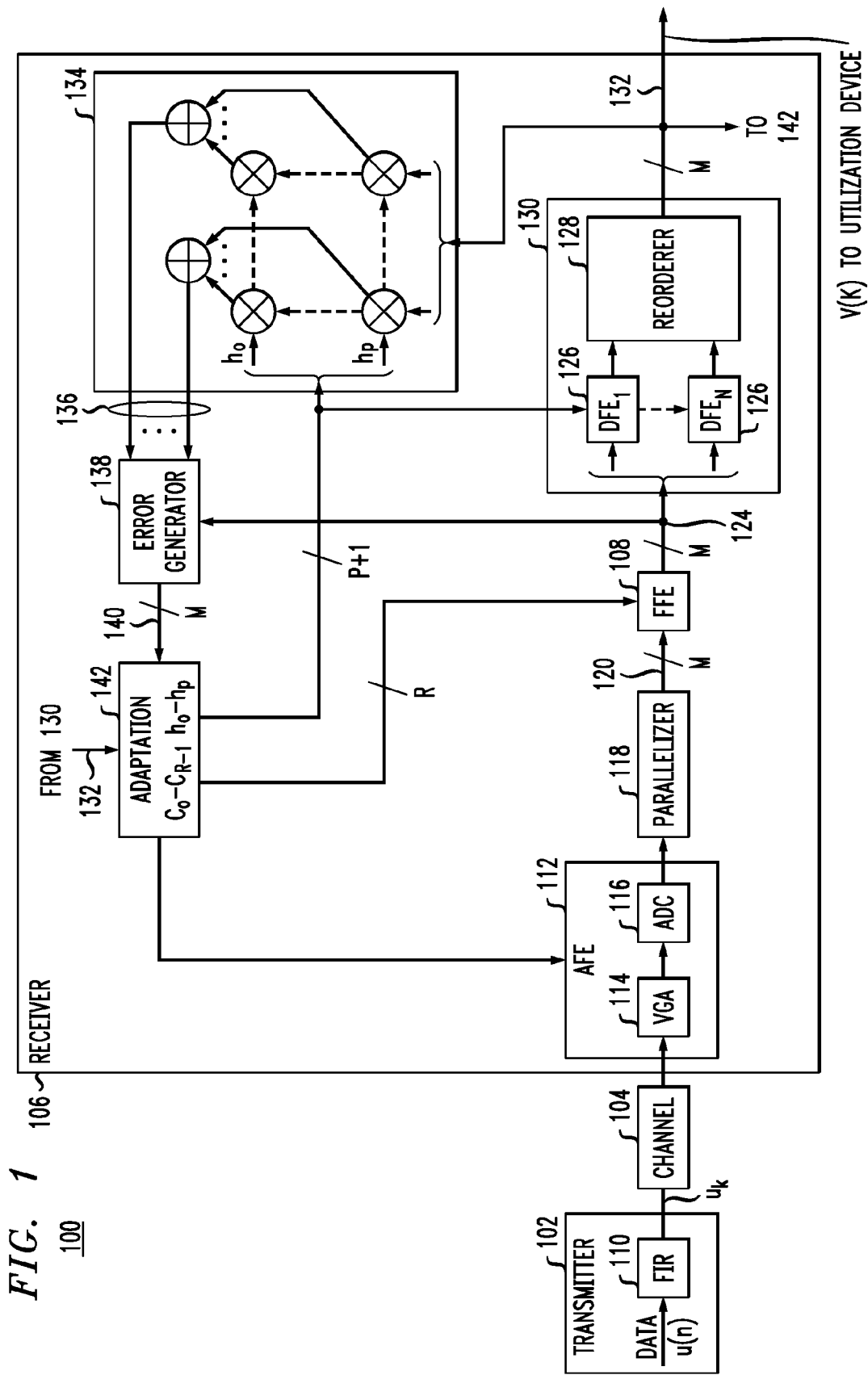
FIG. 1 shows an exemplary high level block diagram of a SERDES communication system employing parallel decision feedback equalization.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

Also for purposes of this description, the terms "couple", "coupling", "coupled", "connect", "connecting", or "connected" refer to any manner known in the art or later developed in which energy is allowed to be transferred between two or more elements, and the interposition of one or more additional elements is contemplated, although not required. Conversely, the terms "directly coupled", "directly connected", etc., imply the absence of such additional elements. Signals and corresponding nodes or ports might be referred to by the same name and are interchangeable for purposes here. The term "or" should be interpreted as inclusive unless stated otherwise. Further, elements in a figure having subscripted reference numbers, e.g., $100_1$, $100_2$, . . . $100_K$, might be collectively referred to herein using a single reference number, e.g., 100.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, an application, or a computer. By way of illustration, both an application running on a controller and the controller can be a component. One or more components may reside within a process and/or thread of execution and a component may be localized on one computer and/or distributed between two or more computers.

Table 1 summarizes a list of acronyms employed throughout this specification as an aid to understanding the described embodiments of the invention:

TABLE 1

| ADC | Analog to Digital Converter | BER | Bit Error Rate |
|---|---|---|---|
| AFE | Analog Front End | DSP | Digital Signal Processing |
| CDR | Clock and Data Recovery | FIFO | First-In-First-Out |
| DFE | Decision Feedback Equalizer | FIR | Finite Impulse Response |
| FFE | Feed Forward Equalizer | ISI | Inter-Symbol Interference |
| IC | Integrated Circuit | PAM | Pulse Amplitude Modulation |
| NRZ | Non-Return to Zero | RF | Radio Frequency |
| RX | Receive | SERDES | Serializer/Deserializer |
| SoC | System on Chip | VGA | Variable Gain Amplifier |

FIG. 1 shows a block diagram of exemplary serializer-deserializer (SERDES) communication system 100. As shown in FIG. 1, SERDES system 100 includes transmitter 102, communication channel 104, and receiver 106. As shown, transmitter 102 might optionally include finite impulse response (FIR) filter 110 for conditioning data before transmission to communication channel 104. In some embodiments, the function of FIR 110 might optionally be moved from transmitter 102 to receiver 106. Transmitter 102 receives data bits u(n) for transmission as serial data symbols, $u_k$, via communication channel 104, to receiver 106. Communication channel 104 might typically be a physical transmission medium, such as a backplane, drive head in a magnetic recording system, copper cables, or optical fibers.

Although described herein as being employed in a SERDES communication system, described embodiments are not so limited, and some embodiments might be employed in alternative communications systems employing a transmitter and a receiver communicating over a communication channel. The communication channel might be at least one of fiber optics, one or more coaxial cables, one or more twisted pair copper wires, and/or one or more radio frequency (RF) channels. Additionally, various signal modulation and de-modulation techniques might be employed. Further, although described herein as each "bit" of a signal having a corresponding logic value, it is understood that the various signals described herein might employ multi-bit data symbols based on various data encoding schemes, such as pulse amplitude modulation (e.g., PAM-4). Further, signal amplitudes might be expressed herein as −1 to 1 such as for Non-Return to Zero (NRZ) signaling, although any signal-encoding scheme might be employed.

After passing though communication channel 104, the analog transmit signal might be filtered or equalized by a conventional analog front end (AFE) 112 of receiver 106. AFE 112 comprises variable gain amplifier (VGA) 114 to amplify the received signal and an optional analog equalizer, and analog-to digital converter (ADC) 116 that provides digital conversion of the input analog signal for processing by, for example, a digital signal processing (DSP) implementation of SERDES receiver 106. ADC 116 samples and digitizes the input analog signal based on timing and control of clock and data recovery (CDR) circuitry (not shown) that is based on a recovered clock signal based on timing of the received signal's data symbols. In this embodiment, the ADC 116 digitizes incoming equalized symbols from the VGA 114 and a "parallelizer" 118 converts or parallelizes the digitized symbols into a parallel format for transmission over bus 120. Here, the parallelizer 118 receives M sequential symbols at a time from the ADC 116 and produces an M-symbol "word" on bus 120, having M lines, for presentation to an optional M-channel parallel feed forward equalizer (FFE) 108 employed to reduce precursor, and sometimes postcursor, intersymbol interference (ISI), where M is an integer greater than one. An exemplary parallel FFE is described in "Parallel Implementation of the DSP Functions of the PAM-5 10 Gb/s Transceiver" by K. K. Parhi, C. Lutkemeyer, A. Abnous, and M. Hatamian, presented at the IEEE 802.3ae Plenary Meeting, March 2000, incorporated herein by reference in its entirety. Other parallel FFE designs can be used instead. Coefficients or tap weights $c_0$-$c_{Q-1}$ (Q is an integer greater than one) for the FFE are supplied by the adaptation unit 142, the values thereof being adjusted in accordance with a conventional algorithm to reduce the precursor ISI below a threshold. Advantageously, by providing digitized symbols in parallel from the ADC 116, the symbol rate received by the receiver 106 is reduced by a factor of M to facilitate digital processing of the digitized symbols by the parallel channel FFE 108 and parallel DFE block 130. For example, if the symbol rate is 12.5 giga-symbols per second (12.5 Gsps) and bus 120 carries eight symbols at a time (M=8), then each line of the bus 120 carries symbols at a rate of 12.5/8 Gsps or less than 1.6 Gsps, with a concomitant reduction in clock frequency for the FFE and DFE circuitry. It is understood that embodiments the parallelizer 118 include providing a serial-to-parallel converter to convert the serially received digitized symbols, pack together M symbols at a time, and output in parallel the M symbols with one clock pulse. In still another embodiment, the ADC 116 might be implemented as M analog-to-digital converters arranged such that each converter digitizes every $M^{th}$ equalized symbol to build up the M symbols for asserting onto bus 120.

Output from the M-channel FFE 108 on bus 124 are fed to N lines of decision feedback equalizers ($DFE_1$-$DFE_N$) 126 in parallel DFE block 130. As will be explained in more detail below, the paralleled DFE lines 126 process the FFE-equalized symbols from parallel channel FFE 108 to reduce postcursor ISI from the received signal and thereby produce N detected data bits v(k) in parallel for eventual presentation on M-bit output bus 132, where N is greater than or equal to M. Each DFE line 126 has a conventional DFE engine in combination with a serial buffer, similar to a first-in-first-out (FIFO) memory, to allow for the parallel decision feedback equalization of groups of M received symbols. In one embodiment and as will be explained in more detail below, the detected data bits produced by the DFEs 126 are not in the order of the symbols from parallelizer 118 and reordering block 128 restores the order or sequence of the bits to match the order of the corresponding symbols on bus 124. The M detected data bits v(k) are provided to a utilization device, such as a computer (not shown), for further processing.

The detected data bits v(k) on bus 132 are also provided to weighting module 134 and to adaptation unit 142. The weighting module 134 takes the product of the detected data bits on bus 132 and P coefficients of the DFEs 126 ($h_1$-$h_P$) and coefficient $h_0$ from adaptation unit 142, where P is an integer greater than one) and sums the products on a per-detected bit basis, the sums applied to the error generator 138 via bus 136 having M paths. A typical error processor generates M error signals on bus 140, each error signal corresponding to a difference between the input symbols on bus 124 and the corresponding weighted value from the weighting module 134.

In this embodiment, the adaptation unit 142 generates control signals for the AFE 112 and two or more groups of weighted tap values or coefficients, here $c_0$-$c_{R-1}$ and $h_0$-$h_P$, calculated based on an estimate of inter-symbol interference (ISI) present in the received signal. The control signals $c_0$-$c_{R-1}$ (R is an integer greater or equal to zero) set the tap coefficients in the FFE 108, the control signals $h_1$-$h_P$ set the tap coefficients in the DFE 126, and the control signal $h_0$ is generally proportional to the amplitude of the signals received by receiver 106. The adaptation module 142 implements one or more of a variety of well-known adaptation algorithms, such as a least-mean-squares (LMS) algorithm, to iteratively reduce the error signals on bus 140 to below a threshold value by adjusting the coefficients.

Described embodiments of a receiver having paralleled decision feedback equalizers that provide linear scaling with the amount of parallelization and relatively little size increase as the number of DFE taps is increased. As will be described, operation of the parallel DFEs is based on parallel block processing, with each block engine being "trained" and performing serial processing. The parallel DFE architecture reduces DFE hardware complexity with performance approximately comparable to a non-parallel DFE. The size of the parallel DFE block 130 increases linearly with the level of parallelization (e.g. a sixteen-way parallel DFE is approximately two times larger than an eight-way parallel DFE). Further, the size of the parallel DFE block has little variation with the number of taps in each line DFE (e.g., a twelve-tap DFE is only slightly larger than an eight-tap DFE). Lastly, the performance of the parallel DFE versus the size of the parallel DFE block can be adjusted based on the length of a training "vector" used to train each DFE engine prior to decoding received symbols.

Figure 2:
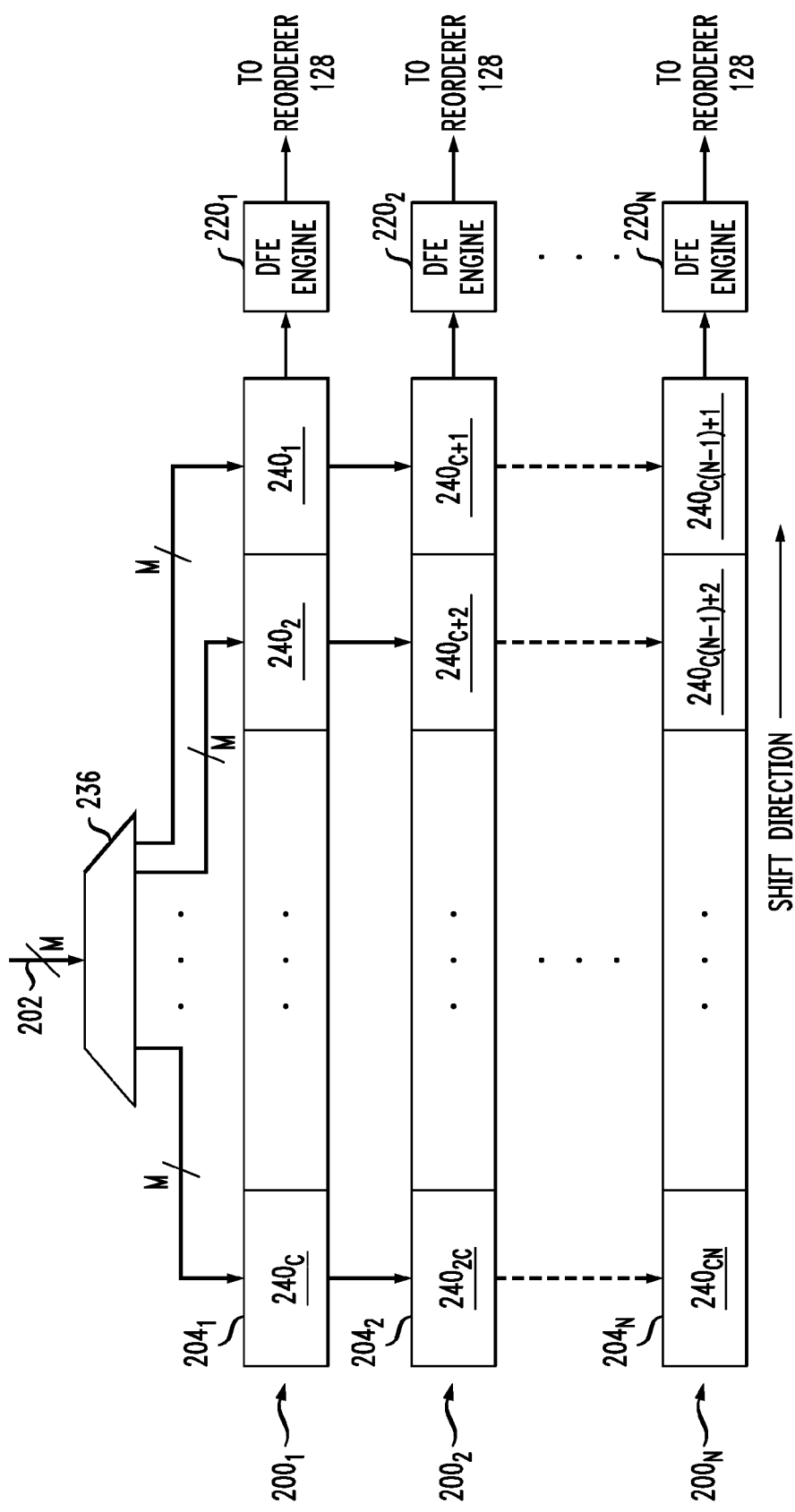
FIG. 2 shows a block diagram of an exemplary N-way parallel DFE implementation in accordance with exemplary embodiments.

In one exemplary embodiment, each DFE line 126 in parallel DFE block 130 generates a binary output based on DFE input data and on one or more previous data decisions of the DFE in combination with one or more coefficients $h_1$-$h_P$, each coefficient corresponding to characteristics of the communication channel 104. As illustrated in FIG. 2, a block diagram of an exemplary N-way parallel DFE 130 is shown having N parallel DFE lines $202_1$-$202_N$. Each line has a serial buffer $204_1$-$204_N$, similar to first-in-first-out (FIFO) memory, and a DFE engine $220_1$-$220_N$. The parallelizer 118 and FFE 108 provide multiple (here M) signal symbols per clock (cycle), shown as input 202. The DFE clock is M times slower than the raw transmission symbol rate. In this embodiment, the number of parallel DFE lines is equal to the number of symbols in each loaded each time, so that here N=M. However, it is understood that there might be more lines 200 than the number of symbols per clock cycle: e.g., N≥M as illustrated in connection with FIG. 4. Generally, C=1, ..., k, where C is the number of "slots" of M symbols that are stored in each serial buffer 204, where one slot is defined as memory needed to hold one clock cycle time number worth of symbols (e.g., M symbols), and k is an integer greater than one. Therefore, in this embodiment, each serial buffer 204 has C×M storage locations. In this embodiment, the input symbols for processing by the DFE engine $220_1$ are loaded into the serial buffer memory $204_1$ M symbols sequentially per clock into slot positions $240_1$ through $240_C$, etc. by a circular loader 236. When the first buffer line ($204_1$) is filled, the next sets of C symbols are loaded into the second buffer line (2042) into slots or positions $240_{C+1}$ through $240_{2C}$, etc., then continuously into the third buffer line (not shown) positions $240_{2C+1}$ through $240_{3C}$, and so on until the last buffer line ($204_N$) is full, then in a circular fashion, the first line is filled again from slot positions $240_1$, $240_2$, $240_3$, etc. Since in this embodiment there are total of M×C storage locations in each of the buffers 204, there 64 where M and C are both equal to eight. Further, there are a total of N×C slots and M×C×N locations in all the buffers, here 64 and 512, respectively, for C=M=N=8.

Data in each serial buffer is processed with its own corresponding DFE engine (e.g., DFE engines $220_1$-$220_N$) at the speed of one symbol (sample) per clock, and the corresponding buffer left-shifted one symbol per clock as the DFE processes the symbols (e.g., the same clock used for loading of the buffer lines that is M-times slower than that of the received symbol rate). Therefore, DFE engines 220 can be implemented without loop unrolling or other techniques that might require relatively high area for implementation. Since DFE engines 520 have a clock rate M-times slower than the data rate in this example, there are N DFE engines in parallel, one per serial buffer. When a DFE engine finishes processing data from its corresponding buffer, the DFE engine starts again from the beginning of the buffer having been refilled with new symbols by the circular loader 236 as described.

Figure 3:
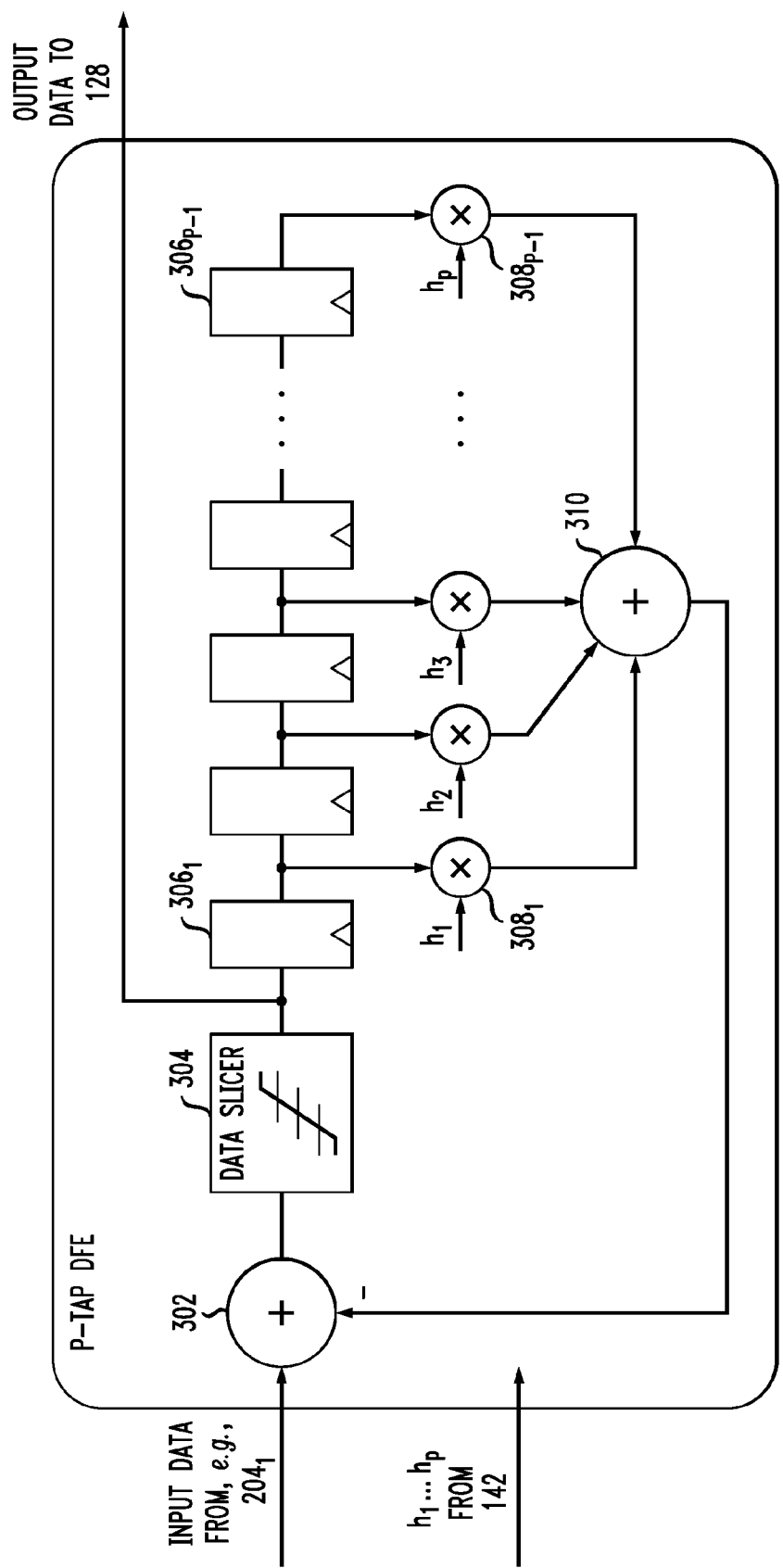
FIG. 3 shows a block diagram of an exemplary DFE engine having P taps or coefficients.

FIG. 3 shows an exemplary DFE engine 300 having P taps as employed in DFE engines 220. The DFE 300 includes summer 302, decision device 304 (e.g., a multi-level data slicer, which might typically be based on an amplitude threshold, but might also be a more complicated detector such as a maximum likelihood sequence detector), P storage elements $306_1$-$306_P$, and P multipliers $308_1$-$308_P$ with coefficients $h_1$-$h_P$, and an adder 310. As shown, data decisions for past bits are stored in storage elements $306_1$-$306_P$ and are provided to corresponding multipliers $308_1$-$308_P$ for weighting by tap coefficients. The summed output of multipliers $308_1$-$308_P$ corresponds to ISI in the received symbols and is provided as the past decision feedback to summer 302 to equalize the incoming bit symbol based on the prior bit decisions of data decision device 304. Decision device 304 then provides a bit decision for the current symbol based on the current symbol value and the past bit decisions. The bit decision is provided to storage elements $306_1$-$306_P$.

Returning to FIG. 2, each of the DFE engines 220 outputs bits that are an estimate of the symbols currently being processed by the DFE engine. In this embodiment, each of the buffers 204 have sixty-four symbols therein so that each DFE engine is processing symbols at multiples of sixty-four symbols and clock cycles different in time from the other DFE engines. So that the output of the receiver 106 (FIG. 1) produces symbols in the order received, decision bits from the DFE engines are submitted to reorderer block 128 (FIG. 1) to store and re-sequence the decision bits into the same order as the symbols from the parallelizer 118. Organization of the reorderer block 128 is dependent on the number of lines 200 and symbols in each serial buffer 204, and implementation of the block 128 is straight-forward and within the capability of anyone skilled in the art.

In the embodiment of FIG. 2, each time one of DFE engines 220 starts processing data from the beginning of the corresponding buffer, the DFE engine might not have a history of past bit decisions, because these past bit decisions were processed in the preceding buffer line (in circular order, e.g., line $200_N$ precedes line $200_1$, etc.). Such a discontinuity in DFE processing might be a source of potential bit decision errors and might concomitantly increase the bit error rate (BER) of receiver 106. However, a non-parallel DFE of more than three taps (P>3) is not practically implementable due to a very large size, whereas a parallel DFE in accordance with described embodiments effectively allows for an arbitrary number of taps P in each DFE engine 220 with a relatively small physical size. Because each DFE engine 220 processes one symbol per clock beat, each engine runs M-times slower than is required for a non-paralleled sequential DFE. Further, it may not be practical to implement a non-paralleled sequential DFE since the clock frequency might be too high to be implementable in today's digital logic technology and instead a non-paralleled sequential DFE is "unrolled" but the size of an unrolled implementation having more than three taps might be prohibitively large and power consuming. In addition, any performance impairments due to the above-described discontinuity in DFE processing are at least partially offset by the availability of many additional DFE taps in this embodiment, e.g., six, resulting in better performance of than an "unrolled" non-parallel DFE with fewer taps. In addition, the paralleled DFE is expected to handle burst errors more reliably.

Figure 4:
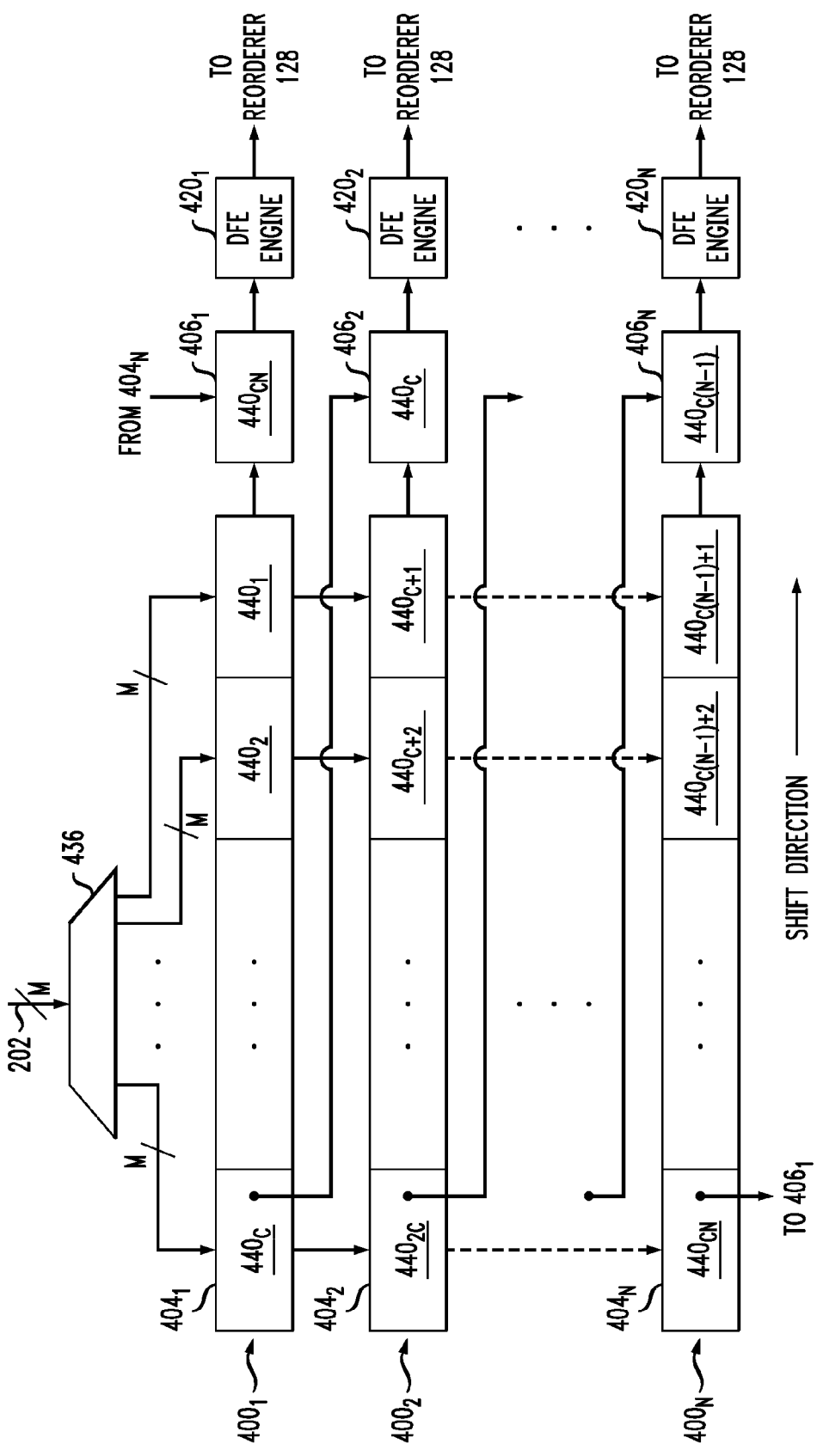
FIG. 4 shows a block diagram of the exemplary N-way parallel DFE implementation of FIG. 2 with exemplary training symbol buffers in accordance with other exemplary embodiments.

To further improve performance of the parallel DFE, the above-described discontinuity in DFE processing is addressed by the implementation of an extension of the processing line in a form of prefix buffers storing training symbols or "vectors", here symbols from the previous serial buffer, i.e., a subset of contiguous symbols to be equalized by one DFE engine are used to train another DFE engine. For example, the last slot $240_8$ of DFE line $200_1$ can be used to train the DFE engine $220_2$. Therefore, each DFE engine of a given serial buffer "trains" itself with symbols from the end of the previous buffer to improve processing of data within the DFE's corresponding buffer, the training symbols being symbols immediately preceding, and contiguous with, the symbols the DFE engine is to equalize. One exemplary embodiment implementing the above training technique is illustrated in FIG. 4. Here, the DFE block 430, similar to block 130 of FIG. 2, has an additional prefix buffers $406_1$-$406_N$ prepended to each of the serial buffers $404_1$-$404_N$. Additionally, the block 430 includes an additional DFE line $400_{N+1}$ having a DFE engine $420_{N+1}$ and corresponding serial buffer $404_{N+1}$ with a prepended prefix buffer $406_{N+1}$. Thus, an eight-way (M=8) parallel DFE has nine serial buffers 404 and corresponding prefix buffers 406 (N=9).

Each prefix buffer $406_1$-$406_N$, here having a length of one slot but might have additional slots as needed, is loaded simultaneously by circular loader 436 as the corresponding new set of symbols is loaded into the corresponding serial buffer $404_1$-$404_N$. For example, when symbol slot $440_C$ is loaded into the end of serial buffer $404_1$, the symbols are also loaded as into prefix buffer $406_2$ in DFE line $400_2$. At the time when a prefix symbols is loaded, the corresponding DFE engine (e.g., DFE $420_2$) might be preloaded with coarsely-sliced decision bits into storage elements 306 (FIG. 3) from symbols prior in time to the prefix vector, such that the linear DFE engine starts processing the prefix vector with some history of decision bits, obtained by the coarse slicing. For purposes here, coarse-slicing of symbols just before the prefix symbols for a given DFE line 400 involves clearing of the registers 306 (FIG. 3) to zero, forcing the summer 310 output to zero and then processing several, e.g., P, symbols by the DFE engine prior to processing those loaded in the corresponding prefix buffer. This initializes the DFE engines so that they might converge faster using the prefix symbols than relying on the prefix symbols alone to initialize the DFE engines.

During processing the prefix vector the DFE engine does not produce a useful output, but it fills its own decision history with "good" decisions so they are ready for processing of useful information. After the training period, the contents of the linear DFE engines are "good enough" to process new information in the serial buffer.

Although shown in FIG. 4 as employing prefix vectors that are eight symbols long, the training prefix vector might be longer or shorter than eight symbols. However, as shown in FIG. 4, the total number of series buffers 404 needs to increase by one for each clock cycle time's number worth of training symbols, rounded up to the nearest next clock boundary. Thus, in the exemplary case shown in FIG. 4 for an eight-way parallel DFE, if the prefix vector is more than zero but eight or fewer symbols (e.g., zero to N for an N-way parallel DFE), one additional buffer line (e.g., buffer line $404_{N+1}$) is needed. In other embodiments, if more than eight symbols but sixteen or fewer symbols are employed for the prefix vector (e.g., N to 2N symbols for an N-way parallel DFE), then two additional buffer lines would be needed, and so on. Extra length of the training vectors increases the performance, but also increases the size of the parallel DFE block.

To determine the number of DFE lines 400, the time it takes for a given DFE line 400 to process all symbols in the corresponding serial buffer 404 is to be the same amount of time it takes to load the symbols into all of the buffers 404, 406. Assuming we have M symbols per clock, then the buffer length in symbols=C×M, the prefix length in symbols=Q×M. A line DFE process one symbol per clock, thus the total processing time=(C+Q)×M clocks. During this time the loader should load all buffers in a cyclical fashion. The loader spent C clocks to load the buffer. So the number of buffers N=(total processing time)/(time to load one buffer)=((C+Q)× M)/C=(1+Q/C)×M, rounded up to the nearest integer.

Figure 5:
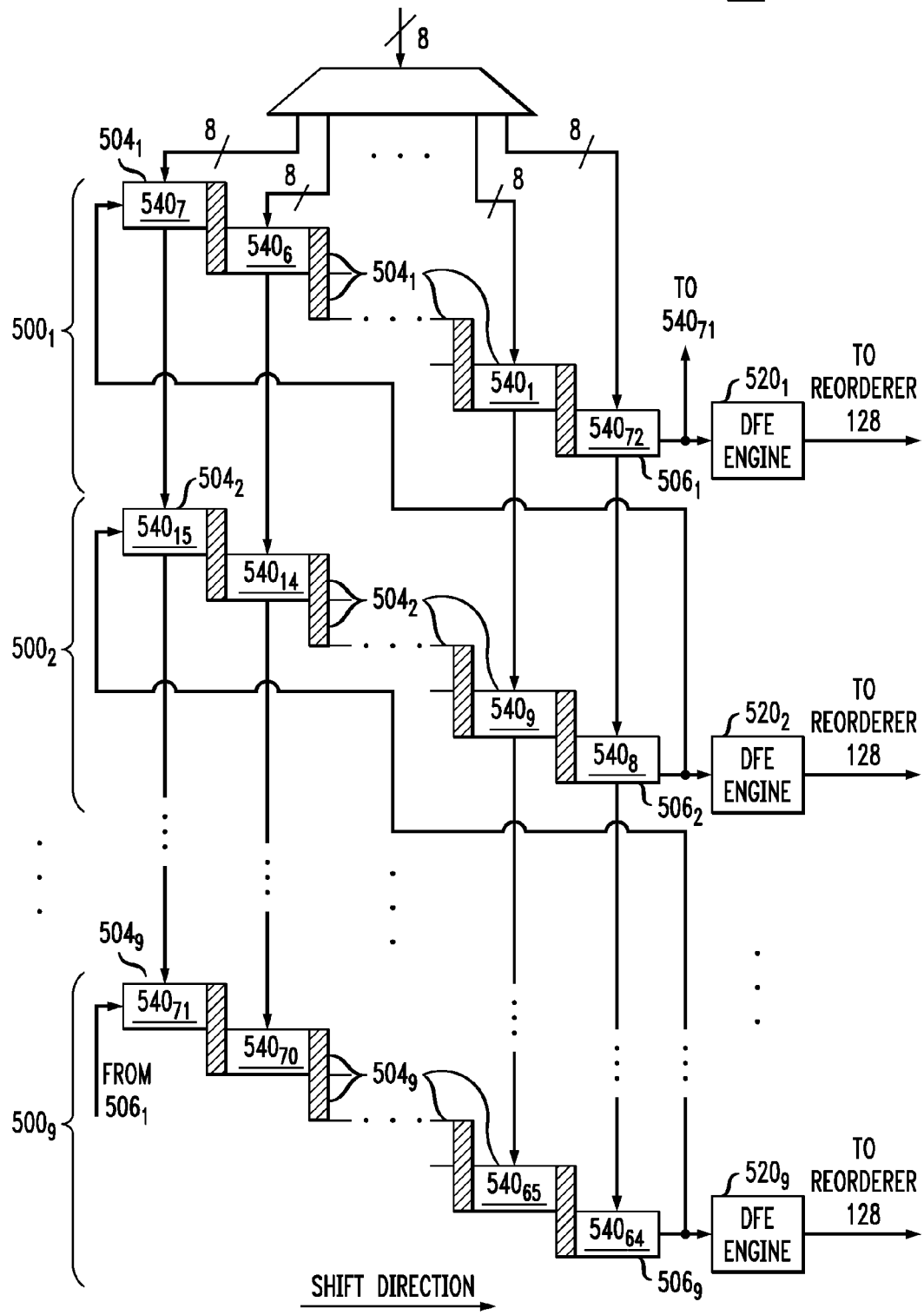
FIG. 5 shows a block diagram of the exemplary N-way parallel DFE of FIG. 4 with reduced memory requirements.

Further improvements for a given parallel DFE implementation 430 are techniques to reduce the size of the serial buffers 404. For example, as illustrated in FIG. 5, symbols can be processed partially in parallel with the loading of the buffers (i.e., using overlapping symbol locations indicated by the shaded portions of buffers 504 and 506) and by sharing buffering hardware between the end of a previous buffer line and the prefix buffer of a next line. Each of these techniques can be used separately but the techniques in combination are illustrated in FIG. 5.

In an exemplary eight-way embodiment (M=8), the overlapping symbol technique is possible because, when the second set of eight symbols is loaded into a slot in a buffer line, the first symbol of the first slot of symbols has already been processed by the corresponding DFE engine, so there are only seven symbols from the first slot of eight symbols to store. Thus the eighth, just emptied location in the buffer may be reused to hold the first symbol of the next eight symbols. This repeats with every clock beat such that, for each new eight symbols to be loaded, one symbol from the front of the buffer line is processed and the whole line shifted to the left by one, allowing the current last position to be re-used to hold the first symbol of the new slot to be loaded. In an exemplary eight-way (M=8) parallel DFE 430 of FIG. 4, each serial buffer 404 and prefix buffer 406 would then have one less location for each slot 440. This technique, for example, allows for the serial buffer $404_1$ and the prefix buffer $406_1$ have a combined total of 63 locations (nine slots of seven symbols per slot) rather than 72 locations (nine slots of eight symbols per slot) for the serial buffer $404_1$ and prefix buffer $406_1$ as shown in FIG. 4.

The technique of sharing buffer hardware is possible because the training symbols for a DFE line have the same content as the tailing symbols of the previous serial buffer, such that the same buffering hardware can be shared between the end of a previous serial buffer line and the prefix buffer of a next line. Referring back to FIG. 4, the slot $440_C$ is also the prefix buffer $406_2$ and slot $440_{2C}$ is also the subsequent prefix buffer (not shown), etc., and slot $440_{C \times N}$ is also the prefix buffer $406_1$. Instead, as shown in FIG. 5 where C=M=8, N=9, the prefix buffer $506_2$ also constitutes the last section of the serial buffer $504_1$, and the prefix buffer $506_2$ is used to train DFE engine $520_2$ as well as the symbols therein being shifted into serial buffer $504_1$ for eventual processing by the DFE engine $520_1$ as information. Similarly, the prefix buffer $506_1$ also constitutes the last section of the serial buffer $504_9$ and the prefix buffer $506_1$ is used to train DFE engine $520_1$ as well as the symbols therein being shifted into serial buffer $504_9$. Thus, this technique allows for reduction of one slot 540 per line 500, saving a total number of M locations per line 500. For C=M=8, N=9, then nine lines of eight slots with eight symbols/slot results in a need for 576 locations, rather than nine lines of nine slots (including one slot of the prefix buffer per line) by eight symbols or 648 locations for the embodiment of FIG. 4.

By combining the above-described overlapping symbol and shared buffer techniques, the buffering hardware (serial buffers 504 and prefix buffers 506) in FIG. 5 is implemented as nine lines of eight slots with seven symbols/slot for a total of 504 locations, rather than nine lines of nine slots with eight symbols/slot for a total of 648 total locations for the embodiment of FIG. 4 without the above-described improvements, a 22% improvement with a commensurate reduction in area for the parallel DFE 530 over the parallel DFE 430 (FIG. 4).

Figure 6C:
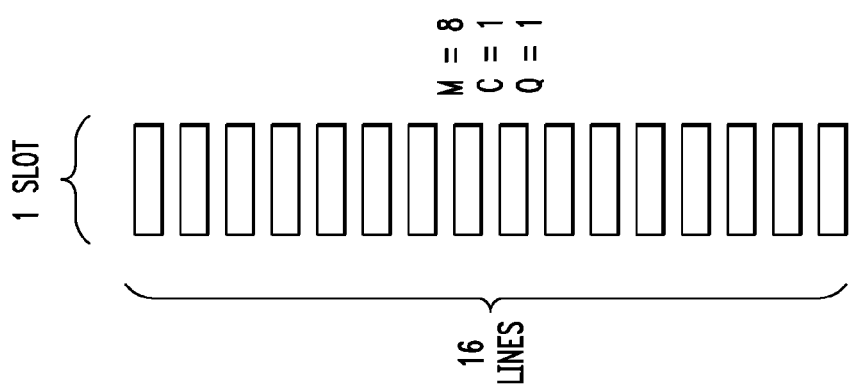
FIGS. 6A-C show exemplary alternative implementations of buffers for the parallel DFE of FIG. 4.
Figure 6B:
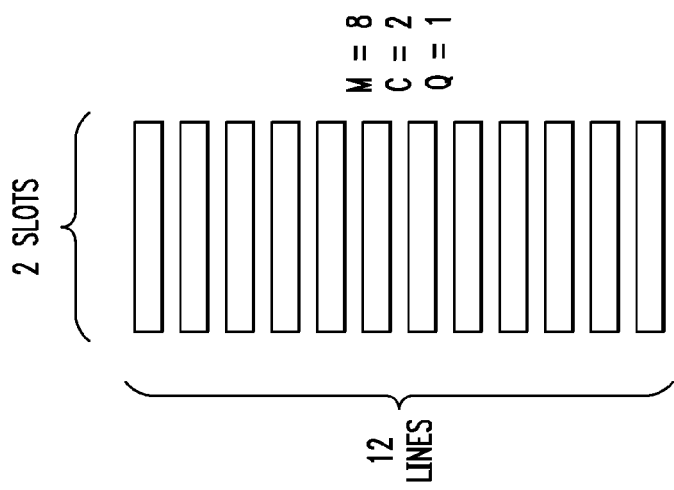
Figure 6A:
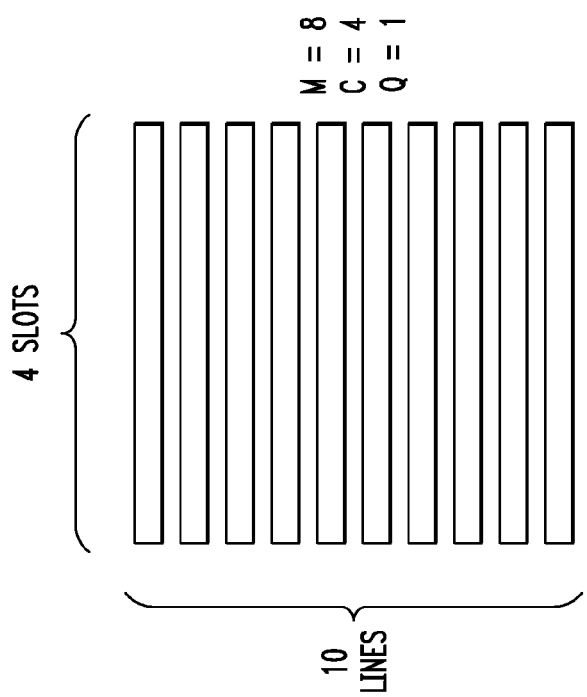

In other embodiments, fewer but longer buffer lines or more but shorter buffer lines can be implemented. Several exemplary cases are shown in FIGS. 6A-C, but any number/ size of buffer lines might be employed. For example, as shown in FIG. 6A, a first embodiment employs a buffer line length of four slots of symbols and a prefix buffer of one slot with each slot having eight symbols, such that M=8, C=4, and Q=1. Thus, using the above formulas, 8×(1+¼) or ten DFE lines 400 are needed with a total of 8×(4+1) or 40 clock beats is required per line to finish processing the stored symbols before new data is loaded. As shown in FIG. 6B, a second embodiment employs a buffer line length of two slots of symbols, such that M=8, C=2, and Q=1. Thus, there are 8×(1+½) or twelve DFE lines are needed and the processing time is 8×(2+1) or 24 clock beats is required per line to finish processing before new data is loaded. As shown in FIG. 6C, a third embodiment employs a buffer line length of one slot of symbols, such that M=8, C=Q=1. Thus, there are 8×(1+1/1) or sixteen DFE line are needed and the total processing time is 8×(1+1) or 16 clock beats is required per line to finish processing before new data is loaded.

The parallel DFE design described here is a cost-efficient solution to achieve performance comparable to single, non-parallel DFE in a digital SERDES system. As described herein, a parallel DFE architecture scales linearly with the level of parallelization and the size of the parallel DFE and varies little with respect to the number of DFE taps as only the DFE engines are affected. Parallel DFE offers performance comparable to that of a standard (non-paralleled) DFE with a controllable tradeoff between performance and size. The discontinuity impairments in the parallel DFE processing are offset by providing prefix buffers and the parallel DFE's ability to implement a large number of taps (in contrast to just two to three taps in typical unrolled DFE), which improves the BER performance.

While embodiments have been described with respect to functional blocks, the embodiments may be implemented in a variety of ways, such as in or part of a single integrated circuit, a multi-chip module, a single card, or a multi-card circuit pack, etc. but are not limited thereto. As would be apparent to one skilled in the art, the various functions might also be implemented as processing blocks in a software program. Such software might be employed in, for example, a digital signal processor, microcontroller, or general-purpose computer. Such software might be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. Described embodiments might also be manifest in the form of a bitstream or other sequence of signal values electrically or optically transmitted through a medium, stored magnetic-field variations in a magnetic recording medium, etc., generated using a method and/or an apparatus as described herein.

It is understood that embodiments of the invention are not limited to the described embodiments, and that various other embodiments within the scope of the following claims will be apparent to those skilled in the art.

We claim:

1. An apparatus for equalizing an input signal to a receiver, comprising:
   an analog-to-digital converter configured to digitize the input signal to form digitized symbols;
   a parallelizer assembling the digitized symbols from the analog-to-digital converter into a parallel sets of M digitized symbols, where M is an integer greater than one;
   N serial buffers, each buffer having C slots of M locations per slot, each buffer configured to store one of the sets of M digitized symbols from the parallelizer in a slot therein, where C is an integer greater than zero and N is an integer greater than one; and
   N decision feedback equalizers responsive to tap weight coefficients and configured to produce parallel sets of M recovered data bits, each decision feedback equalizer coupled to a corresponding one of the N serial buffers and configured to process digitized symbols stored in the corresponding one of the N serial buffers.

2. The apparatus of claim 1 wherein each of the paralleled decision feedback equalizers is additionally configured to process digitized symbols from the corresponding one of the N serial buffers after having been trained on a set of previously stored digitized symbols.

3. The apparatus of claim 2 wherein, for at least one of the paralleled decision feedback equalizers, the set of previously stored digitized symbols is a set of digitized symbols stored in a serial buffer different from the serial buffer corresponding to the at least one paralleled decision feedback equalizer.

4. The apparatus of claim 1 further comprising:
   N prefix buffers having Q slots, each prefix buffer coupling to a corresponding one of the N decision feedback equalizers, where Q is an integer greater the one and less than C;
   wherein each of the paralleled decision feedback equalizers is configured to train using a set of past digitized symbols loaded into the corresponding prefix buffer.

5. The apparatus of claim 4 wherein, for at least one of the N prefix buffers, the set of past digitized symbols is a set of digitized symbols stored in a serial buffer different from the serial buffer corresponding to the at least one prefix buffer.

6. The apparatus of claim 5 wherein the set of past digitized symbols stored in the serial buffer different from the serial buffer corresponding to the at least one prefix buffer is a set of past digitized symbols stored in a last slot of the different serial buffer.

7. The apparatus of claim 4 wherein for at least one of the prefix buffers, the at least one prefix buffer is configured to receive symbols substantially simultaneously as corresponding symbols are stored in a serial buffer different from the at least one serial buffer coupled to the decision feedback equalizer coupled to the at least one prefix buffer.

8. The apparatus of claim 4, wherein for at least one of the serial buffers, a last slot of the at least one serial buffer and the prefix buffer for a decision feedback equalizer different from the decision feedback equalizer corresponding to the at least one serial buffer is implemented as a single buffer.

9. The apparatus of claim 4, wherein the prefix buffers are disposed between the corresponding serial buffers and corresponding decision feedback equalizers, such that symbols stored in the prefix buffers are processed by the corresponding decision feedback equalizer before symbols in the corresponding serial buffer are processed.

10. The apparatus of claim 1 further comprising:
    a adaptation controller configured to generate the common tap weight coefficients in response to M error signals;
    a weighting module configured to generate M weighted signals from the common tap weight coefficients and the M recovered data bits; and
    an error generator responsive to the M weighted signals and the set of M symbols from the parallizer to generate the M error signals;
    wherein each of the M weighted signals is a sum of products of a corresponding one of the M detected data bits and at least one of the common tap weight coefficients from the adaptation controller.

11. The apparatus of claim 10 wherein each of the M error signals corresponds to a difference between corresponding ones of the symbols in the set of M symbols from the parallelizer and the corresponding ones of the M weighted signals from the weighting module.

12. The apparatus of claim 10 further comprising:
    a feed-forward equalizer, responsive to the adaptation controller, disposed between the analog-to-digital converter and the parallelizer; and
    a variable gain amplifier, responsive to the adaptation controller, coupled to an input of the analog-to-digital converter, the variable gain amplifier configured to amplify the input signal to the analog-to-digital converter.

13. The apparatus of claim 1 further comprising:
    a reorderer, coupled each of the N decision feedback equalizers;
    wherein the parallel sets of M digitized symbols has an order and the reorderer is configured to reorder the M recovered data bits from the N decision feedback equalizers to match the order of the parallel sets of M digitized symbols.

14. The apparatus of claim 1 wherein N=M.

15. The apparatus of claim 1, wherein N is equal to M×(1+ Q/C), rounded up to the next integer.

16. The apparatus of claim 15 wherein M=C=8 and Q=1.

17. The apparatus of claim 1 wherein each decision feedback equalizer has P taps, where P is an integer greater than one.

18. The apparatus of claim 17 wherein each of the decision feedback equalizers comprise P registers that are preloaded with coarsely-sliced decision bits from previously digitized symbols.

19. The apparatus of claim 1, wherein the apparatus is embodied in a Serializer-Deserializer (SERDES) device.

20. The apparatus of claim 1, wherein the apparatus is implemented in an integrated circuit.

21. An apparatus for equalizing an input signal to a receiver, comprising:
an analog-to-digital converter configured to digitize the input signal to form digitized symbols;
a parallelizer assembling the digitized symbols from the analog-to-digital converter into a parallel sets of M digitized symbols, where M is an integer greater than one;
N serial buffers, each buffer having C slots of M locations per slot, each buffer configured to store one of the sets of M digitized symbols from the parallelizer in a slot therein, where C is an integer greater than zero and N is an integer greater than or equal to M;
N decision feedback equalizers responsive to tap weight coefficients and configured to produce parallel sets of M recovered data bits, each decision feedback equalizer coupled to a corresponding one of the N serial buffers and configured to process digitized symbols stored in the corresponding one of the N serial buffers;
N prefix buffers having Q slots, each prefix buffer coupling to a corresponding one of the N decision feedback equalizers, where Q is an integer greater the one and less than C;
wherein each of the paralleled decision feedback equalizers is configured to train using a set of past digitized symbols loaded into the corresponding prefix buffer.

22. The apparatus of claim 21 further comprising:
a reorderer, coupled each of the N decision feedback equalizers;
wherein the parallel sets of M digitized symbols has an order and the reorderer is configured to reorder the M recovered data bits from the N decision feedback equalizers to match the order of the parallel sets of M digitized symbols.

23. The apparatus of claim 21, wherein the prefix buffers are disposed between the corresponding serial buffers and corresponding decision feedback equalizers, such that symbols stored in the prefix buffers are processed by the corresponding decision feedback equalizer before symbols in the corresponding serial buffer are processed.

24. The apparatus of claim 23 further comprising:
a adaptation controller configured to generate the common tap weight coefficients in response to M error signals;
a weighting module configured to generate M weighted signals from the common tap weight coefficients and the M recovered data bits; and
an error generator responsive to the M weighted signals and the set of M symbols from the parallizer to generate the M error signals;
wherein each of the M weighted signals is a sum of products of a corresponding one of the M detected data bits and at least one of the common tap weight coefficients from the adaptation controller.

25. The apparatus of claim 21 further comprising:
a reorderer, coupled each of the N decision feedback equalizers;
wherein the parallel sets of M digitized symbols has an order and the reorderer is configured to reorder the M recovered data bits from the N decision feedback equalizers to match the order of the parallel sets of M digitized symbols.

26. The apparatus of claim 21, wherein N is equal to M×(1+ Q/C), rounded up to the next integer.

27. The apparatus of claim 21 wherein each decision feedback equalizer has P taps and P registers that are preloaded with coarsely-sliced decision bits from previously digitized symbols, where P is an integer greater than one.

28. The apparatus of claim 21, wherein the apparatus is embodied in a Serializer-Deserializer (SERDES) device.

29. The apparatus of claim 28, wherein the apparatus is implemented in an integrated circuit.

30. A method of processing an input signal to a receiver, the method comprising:
generating, by an analog-to-digital converter in the receiver, a set of digitized symbols of the input signal;
assembling the digitized symbols from the analog-to-digital converter into a parallel sets of M digitized symbols, where M is an integer greater than one;
storing in N serial buffers the parallel sets of M digitized symbols, each buffer having C slots of M locations per slot, each slot for storing one set of M digitized symbols therein, where C is an integer greater than zero and N is an integer greater than or equal to M; and
producing parallel sets of M recovered data bits using N decision feedback equalizers responsive to tap weight coefficients, each of the decision feedback equalizers processing symbols stored in a corresponding one of the N serial buffers.

31. The method of claim 30 further comprising the step of:
training the paralleled decision feedback equalizers using a set of past digitized symbols;
wherein the past digitized symbols are loaded into corresponding prefix buffers, each prefix buffer having Q slots and coupling to a corresponding one of the N decision feedback equalizers, where Q is an integer greater the one and less than C.

32. The method of claim 31 further comprising the step of:
reordering the M recovered data bits from the N decision feedback equalizers to match an order of the parallel sets of M digitized symbols.

33. The method of claim 30 wherein N equals M×(1+Q/C), rounded up to the next integer.

34. The method of claim 30 wherein each decision feedback equalizer has P taps and P registers, where P is an integer greater than one, further comprising the step of:
preloading the P registers with coarsely-sliced decision bits from previously digitized symbols.

* * * * *